Nov. 13, 1928.
J. R. LITTY ET AL
1,691,727
FRUIT CLEANING MACHINE
Filed March 22, 1927     2 Sheets-Sheet 1
FIG_1_
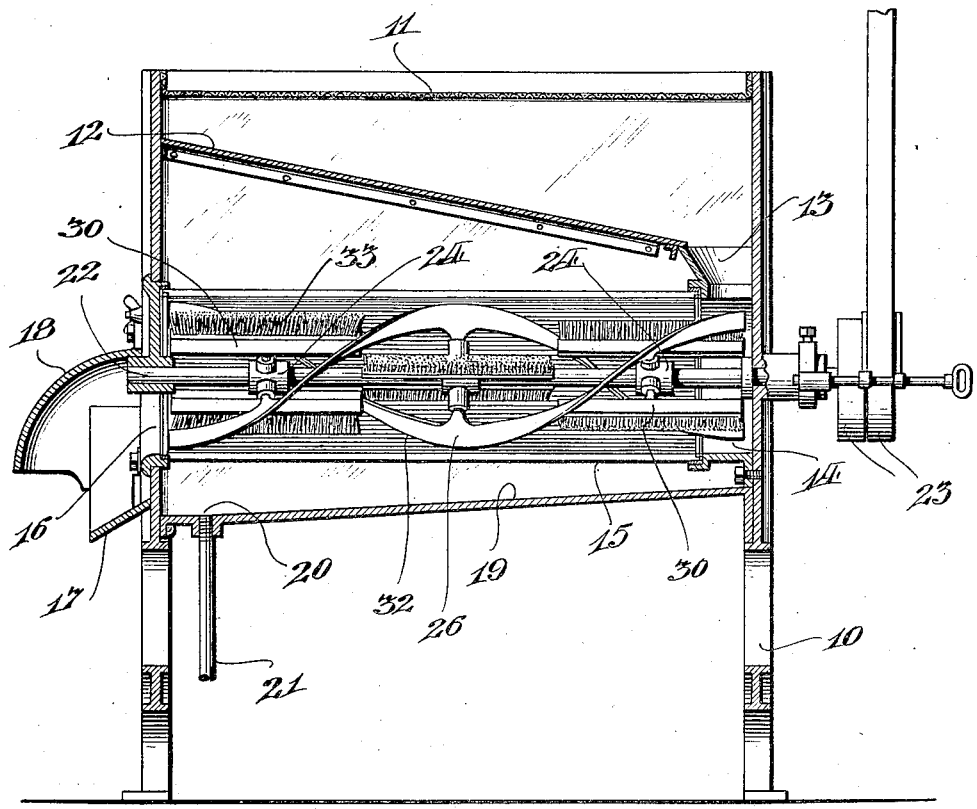
WITNESSES:
INVENTORS:
John R. Litty &
Trued B. Lundin,
BY
Joshua R. H. Potts
ATTORNEY.

Nov. 13, 1928. 1,691,727
J. R. LITTY ET AL
FRUIT CLEANING MACHINE
Filed March 22, 1927 2 Sheets-Sheet 2
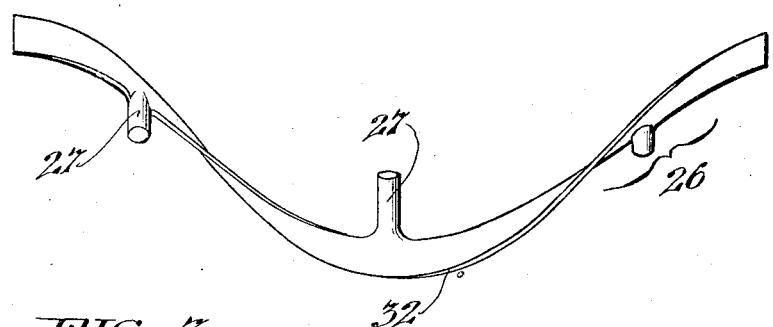
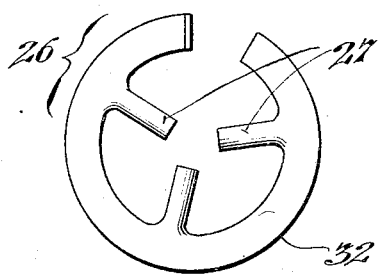
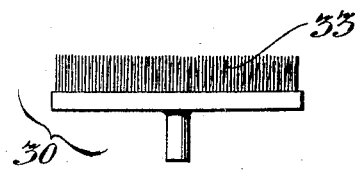
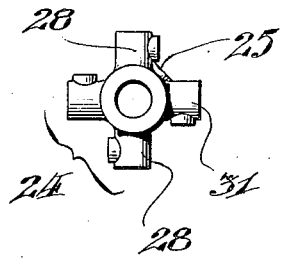
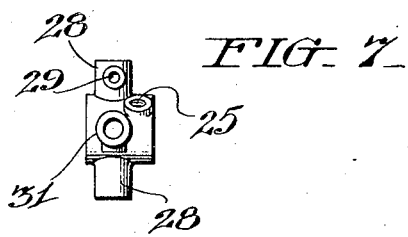
WITNESSES:
INVENTORS:
John R. Litty &
Trued B. Lundin,
BY
Joshua R. H. Potts
ATTORNEY.

Patented Nov. 13, 1928.

1,691,727

UNITED STATES PATENT OFFICE.

JOHN R. LITTY AND TRUED B. LUNDIN, OF PHILADELPHIA, PENNSYLVANIA.

FRUIT-CLEANING MACHINE.

Application filed March 22, 1927. Serial No. 177,244.

Our invention relates to fruit cleaning machines and more particularly to a machine adapted to remove the dirt and stems from raisins, currants and the like.

We are aware that such machines have been previously produced but the capacity of such machines is limited and the screen, through which the dirt and stems are forced, must be often removed for the purpose of cleaning.

One of the objects of our invention is to provide a machine which will have a large capacity and which may be operated for long periods of time without removing the screen in order to clean same.

Another object of our invention is to provide improved means for feeding the fruit longitudinally of the screen whereby the efficiency and capacity of the machine will be greatly increased over those of the machines now in use.

According to the invention, the fruit cleaning machine comprises a frame having a rotatable shaft therein, a cleaning drum surrounding the shaft, means for delivering fruit and water to the interior of the machine, brushes secured to the shaft longitudinally thereof with their bristles in contact with the drum, beaters having their outer edges spaced from the walls of the drum, and stems formed integral with the beaters for securing the beaters to the shaft, each beater extending substantially the entire length of the drum and making nearly a complete turn around the shaft.

The drawings illustrate an embodiment of the invention and the views therein are as follows:

Figure 1 is a central longitudinal sectional view through a fruit cleaning machine embodying our invention, Figure 2 is a side view of a conveying beater forming a part of our invention, and Figure 3 an end view of the beater shown in Figure 2.

Figure 4 is a side view, and

Figure 5 an end view of a brush forming a part of our invention.

Figure 6 is an end view, and

Figure 7 a side view of a member, by means of which the beaters and brushes are attached on the main shaft of the machine.

Referring now more particularly to Figure 1, the machine has a frame 10 with a screen 11 suitably mounted therein on which the fruit to be cleaned is placed and subjected to a considerable flow of water which washes the fruit and dirt through the screen 11 onto a diaphragm 12 extending from side to side of frame 10 and sloping downwardly longitudinally of the machine. The water and fruit are carried down this slope into a hopper 13 which leads into a chamber 14 communicating with a cleaning drum 15.

The drum is preferably composed of two cylindrical heads between which are supported a plurality of bars spaced from one another so as to provide interstices therebetween for the passage of dirt and stems which are removed from the fruit by the cleaning process. The drum is suitably clamped in frame 10 with its rear end communicating with chamber 14 and its forward end communicating with an opening 16 below which a chute 17 is mounted.

The fruit passes from chamber 14 into drum 15, where it is cleaned and moved forwardly as will be later described, and passes out through opening 16 into suitable receptacles into which it is guided by chute 17 and by a hood 18 positioned above chute 17. The dirt and stems from the fruit, together with the water used in the cleaning process, are caught by a bottom wall 19 which slopes forwardly to a drain 20 through which the water, dirt and stems are carried into a drain pipe 21. A main shaft 22 is rotatably mounted in frame 10 and driven in any suitable manner, as by loose and tight pulleys 23. A series of clamping members 24 are mounted on shaft 22 and held in selected position by means of set screws threaded in holes 25.

Referring now to all the views simultaneously, a conveying beater 26 is provided with a plurality of stems 27 which are adapted to be inserted in sockets 28 formed on members 24 and are held therein by set screws threaded into the holes 29. Beater 26 is spiral in shape and is preferably made in sections and welded or brazed together after it has been assembled in members 24 on shaft 22. Two beaters are provided in each machine and each beater makes a spiral of nearly 360 degrees, as shown in Figures 2 and 3. A brush 30 is inserted in sockets 31, formed on members 24 at right angles to sockets 28, and held in place by set screws.

Beater 26 is so positioned in members 24 on shaft 22 that a substantial clearance is provided between its outer edge 32 and the inside wall of cleaning drum 15 in order that the fruit being cleaned will not be caught therebetween and crushed. Brushes 30 are so positioned in members 24 that their bristles 33 engage the inner surface of cleaning drum 15 for the purpose of keeping same free from dirt and allowing free passage of the water and foreign matter between the bars composing the drum.

In operation, a quantity of fruit to be cleaned is placed on screen 11 and a stream of water turned thereon which breaks up the mass of fruit, washes off the greater part of the dirt and carries the fruit through screen 11 onto diaphragm 12. The flow of water carries the fruit down the sloping surface of diaphragm 12 through hopper 13, chamber 14, and into drum 15 in comparatively small quantities relatively to the cross sectional area of drum. Shaft 22 is rotating rapidly so that the fruit is caught by beaters 26 and hurled against the inside of drum 15, thereby knocking the remaining dirt and stems from the fruit, while the spiral shape of the beaters causes the fruit to be fed forwardly and delivered through opening 16 and chute 17 into suitable receptacles. As shaft 22 revolves it carries with it brushes 30 which sweep the inside of drum 15 clean, thus allowing free egress of the water, dirt and stems.

In actual operation, we find that the fruit delivered by our improved machine is cleaner and in much better condition than that delivered by other machines in use at present and that it has a capacity of at least 50% greater than such machines. The machine is primarily designed for cleaning raisins, currants and the like and the fruit delivered from the machine is found to be entirely free of all dirt, grit and stems and comparatively dry.

Of course, the fruit cleaning machine illustrated may be modified and changed in various ways without departing from the invention herein disclosed.

We claim:

1. A fruit cleaning machine including a frame; a shaft rotatable in the frame; a cleaning drum mounted in the frame and surrounding the shaft; means for delivering fruit and water to the interior of the drum; clamping members secured on the shaft; beaters disposed spirally about the shaft with their outer edges spaced from the inner wall of the drum and extending substantially the entire length of the drum; stems formed on the beaters and secured in the clamping members; brushes held by the clamping members at right angles to the beater stems and disposed longitudinally of the drum, the bristles of the brushes engaging the inner wall of the drum, and means to rotate the shaft.

2. A fruit cleaning machine including a frame, a shaft rotatable therein, means for rotating the shaft, a cleaning drum surrounding the shaft, means for delivering fruit and water to the interior of the machine, brushes secured to the shaft longitudinally thereof with their bristles in contact with the drum, beaters having their outer edges spaced from the walls of the drum, and stems formed integral with the beaters for securing the beaters to the shaft; each beater extending substantially the entire length of the drum and making nearly a complete turn around the shaft.

In testimony whereof we have signed our names to this specification.

JOHN R. LITTY.
TRUED B. LUNDIN.